(No Model.) 2 Sheets—Sheet 1.
S. R. DRESSER.
DEVICE FOR STOPPING LEAKY JOINTS IN GAS OR OTHER PIPES.
No. 583,252. Patented May 25, 1897.
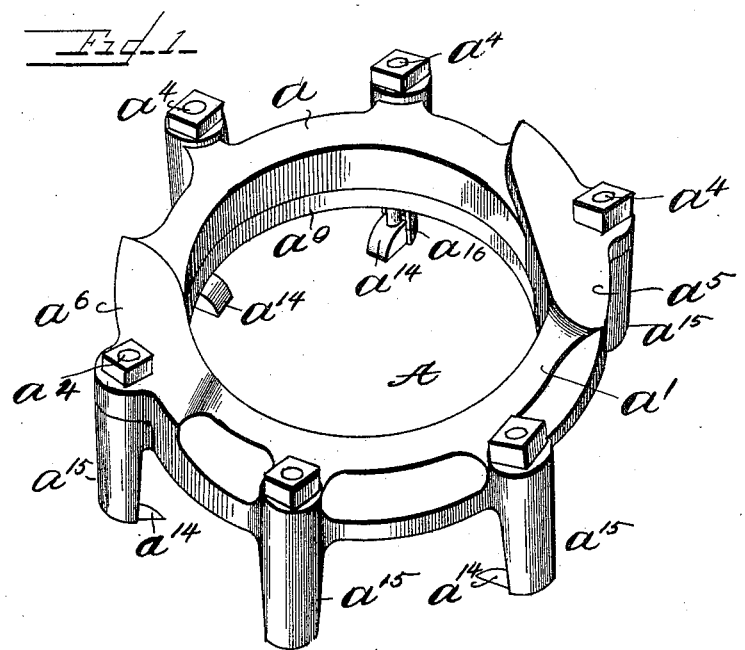
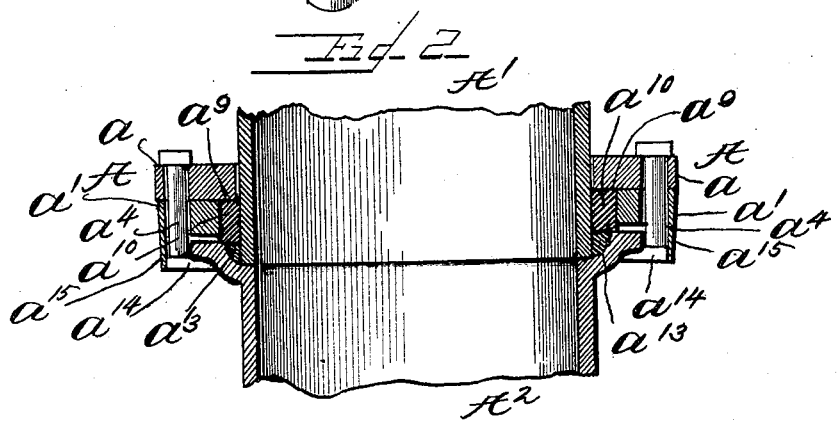
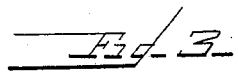
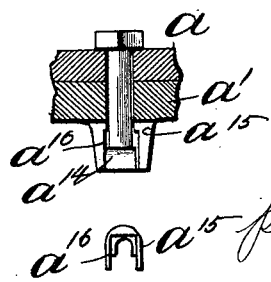
Witnesses
Inventor
S. R. Dresser
per Hallock & Halleck
Attorneys

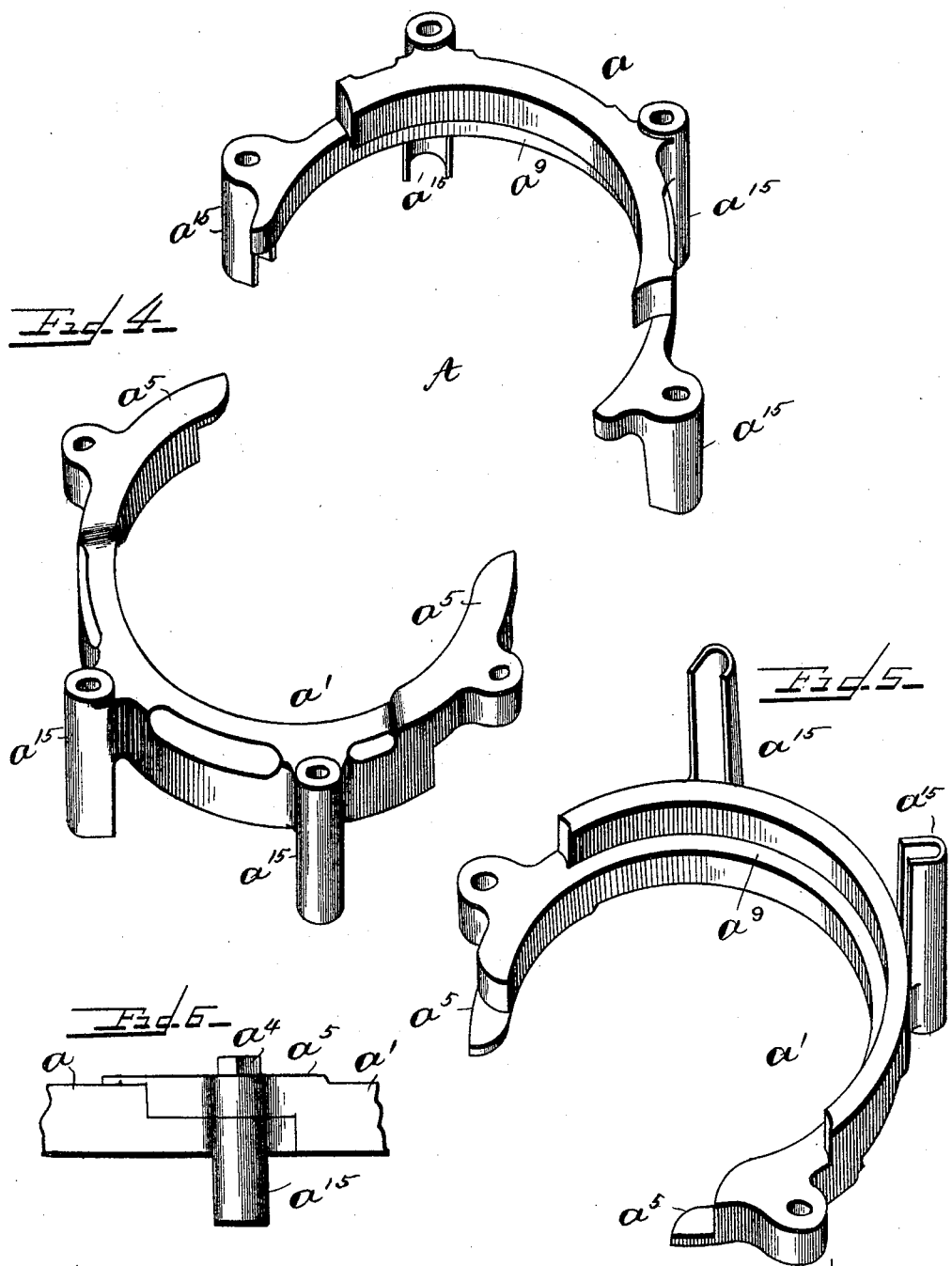

UNITED STATES PATENT OFFICE.

SOLOMON R. DRESSER, OF BRADFORD, PENNSYLVANIA.

DEVICE FOR STOPPING LEAKY JOINTS IN GAS OR OTHER PIPES.

SPECIFICATION forming part of Letters Patent No. 583,252, dated May 25, 1897.

Application filed June 20, 1894. Serial No. 515,154. (No model.)

*To all whom it may concern:*

Be it known that I, SOLOMON R. DRESSER, a citizen of the United States, residing at Bradford, in the county of McKean and State of Pennsylvania, have invented certain new and useful Improvements in Devices for Stopping Leaky Joints in Gas or other Pipes; and I do hereby declare the following to be a full, clear, and exact description of the invention, such as will enable others skilled in the art to which it appertains to make and use the same.

My invention is an improved repair construction for stopping leaky pipe-joints, applicable particularly to bell-and-spigot joints; and it consists in the novel features of construction and combination of parts hereinafter described, reference being had to the accompanying drawings, which illustrate one form in which I have contemplated embodying my invention, and said invention is fully disclosed in the following description and claims.

Referring to the said drawings, Figure 1 is a perspective view of my improved repair device. Fig. 2 is a sectional view of a bell-and-spigot joint, showing my repair device applied thereto. Fig. 3 is a detail view showing the form of bolt used and one of the polygonal retaining-walls of the clamp. Fig. 4 is a perspective view of the device with the parts separated. Fig. 5 is a perspective view of one of the parts inverted. Fig. 6 is a partial side view of the device, showing the overlapping portions of the two parts.

In the drawings, A' represents the plain pipe end, and $A^2$ the bell of the bell-and-spigot joint, which are connected by metal packing, as shown at $a^{13}$.

A represents my improved repair clamp-ring, which is formed in sections, in this instance two in number, the ends of said sections being stepped to engage the ends of the other section. At intervals the clamp-ring A is provided with bolt-holes for the reception of securing-bolts $a^4$, which have their heads of polygonal form and provided each with a lateral projection $a^{14}$, which is constructed to engage the exterior of the flange of the bell $A^2$, as shown in Fig. 2. Two of these bolts pass through the overlapping stepped portions of the ring-sections and serve also to secure the sections rigidly together. Adjacent to each of these bolt-holes the clamp-ring is provided with a retaining wall or flange, extending at right angles to the plane of the ring, and having a portion adapted to engage the bolt-head on the side opposite its lug or projection $a^{14}$, to hold the said lug in engagement with the exterior of the bell and prevent it from slipping off or away from the flange of the bell. I prefer to form the retaining walls or flanges polygonal in cross-section corresponding to the shape of the bolt-heads, so that the bolt-heads will lie within said walls, as shown, and will also be held from turning in addition to being held rigidly in engagement with the bell. In the drawings I have shown bolts having squared heads, and the retaining walls or flanges are therefore provided with the rear portion $a^{15}$ and the side portions $a^{16}$. The clamp-ring A is also provided with an annular recess $a^9$ adjacent to its inner edge, which is adapted to receive a packing-ring $a^{10}$, of rubber or other suitable material.

The operation of the device is as follows: When a bell-joint is found to leak, the sections of one of my clamp-rings A are placed around the straight pipe, as shown in Fig. 2, with the recess $a^9$ on the side toward the bell and the packing-ring $a^{10}$ in said recess. The bolts $a^4$ are placed in the bolt-holes and retaining walls or flanges, and the nuts are turned up, so as to force the lugs $a^{14}$ into engagement with the exterior of the bell, thereby drawing the clamp-ring toward the bell and clamping the packing-ring tightly over the annular recess between the edges of the bell and the pipe A' and stopping the leak. The rear portions $a^{15}$ of the retaining walls or flanges will hold the bolts in engagement with the bell $A^2$ and the side portions of said retaining-walls will prevent the bolts from turning while the nuts are being screwed up.

What I claim, and desire to secure by Letters Patent, is—

1. A repair device for stopping leaks in bell-and-spigot joints comprising among its members a sectional clamp-ring having an annular recess adapted to receive a packing-ring and provided with circular bolt-holes through both sections, said ring being also provided with projections extending from one side of the same, said projections being provided with polygonal recesses on their inner sides and clamping-bolts having round bodies and polygonal heads, said heads having projections to engage the exterior of said bell and adapted to engage the recesses of said projections whereby the said bolts are held in engagement with the bell and prevented from turning, substantially as described.

2. A repair device for stopping leaks in bell-and-spigot joints, comprising among its members a sectional clamp-ring having an annular recess adapted to receive a packing-ring and provided with bolt-holes through both sections, said clamp-ring being provided with projections extending from one side of the same and clamping-bolts having heads, projections for engaging the exterior of the bell part of the joint and engaging the ring projections, the two fitting together to prevent the bolts from turning, substantially as described.

In testimony whereof I affix my signature in presence of two witnesses.

SOLOMON R. DRESSER.

Witnesses:
GEO. P. BOOTHE,
GEORGE J. WOLF.